E. J. KLINK AND F. MUELLER.
AUTOMATIC STOP ATTACHMENT FOR TRACTORS.
APPLICATION FILED JUNE 29, 1921.
1,437,522.
Patented Dec. 5, 1922.
2 SHEETS—SHEET 1.
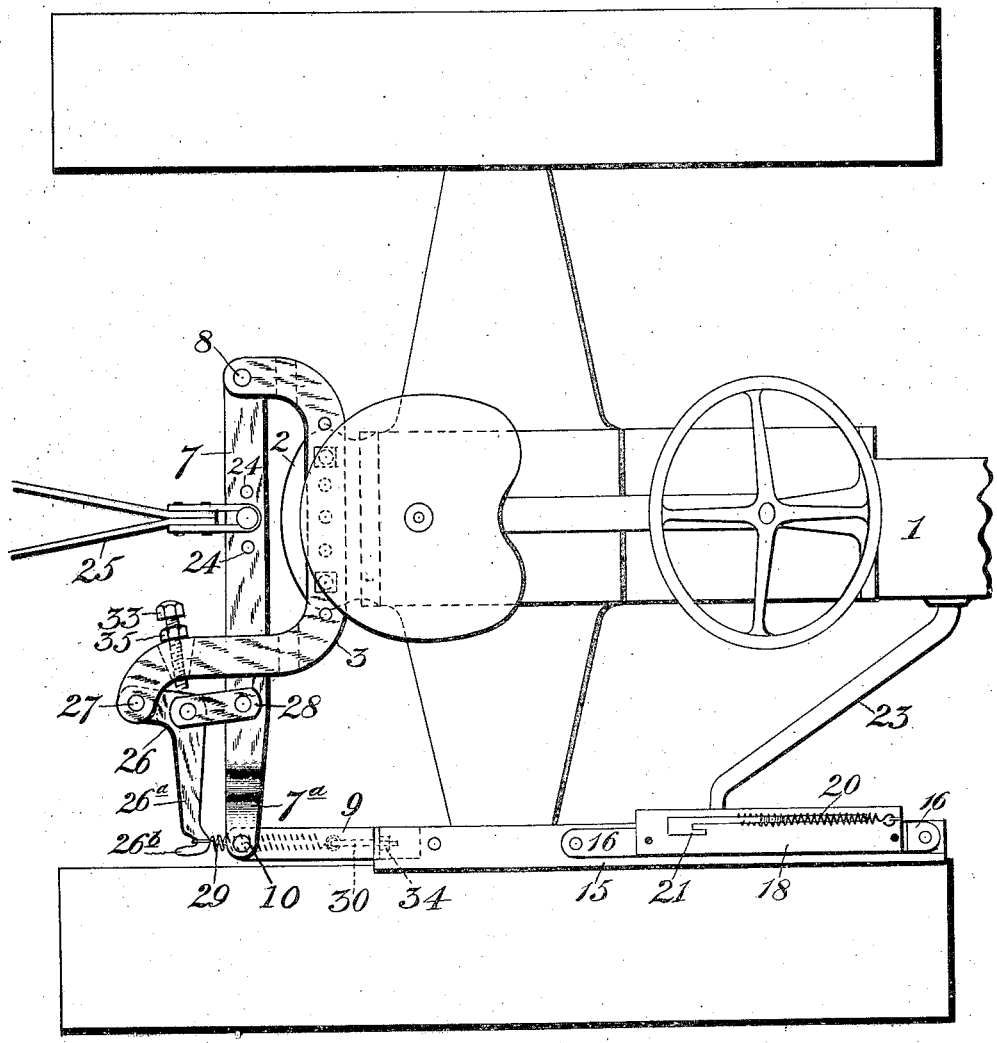
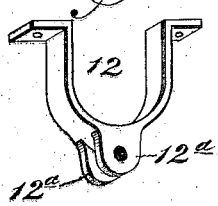
Inventors
Eugene J. Klink
and
Frank Mueller
By E. E. Overholt
Attorney E. J. KLINK AND F. MUELLER.
AUTOMATIC STOP ATTACHMENT FOR TRACTORS.
APPLICATION FILED JUNE 29, 1921.
1,437,522.
Patented Dec. 5, 1922.
2 SHEETS—SHEET 2.
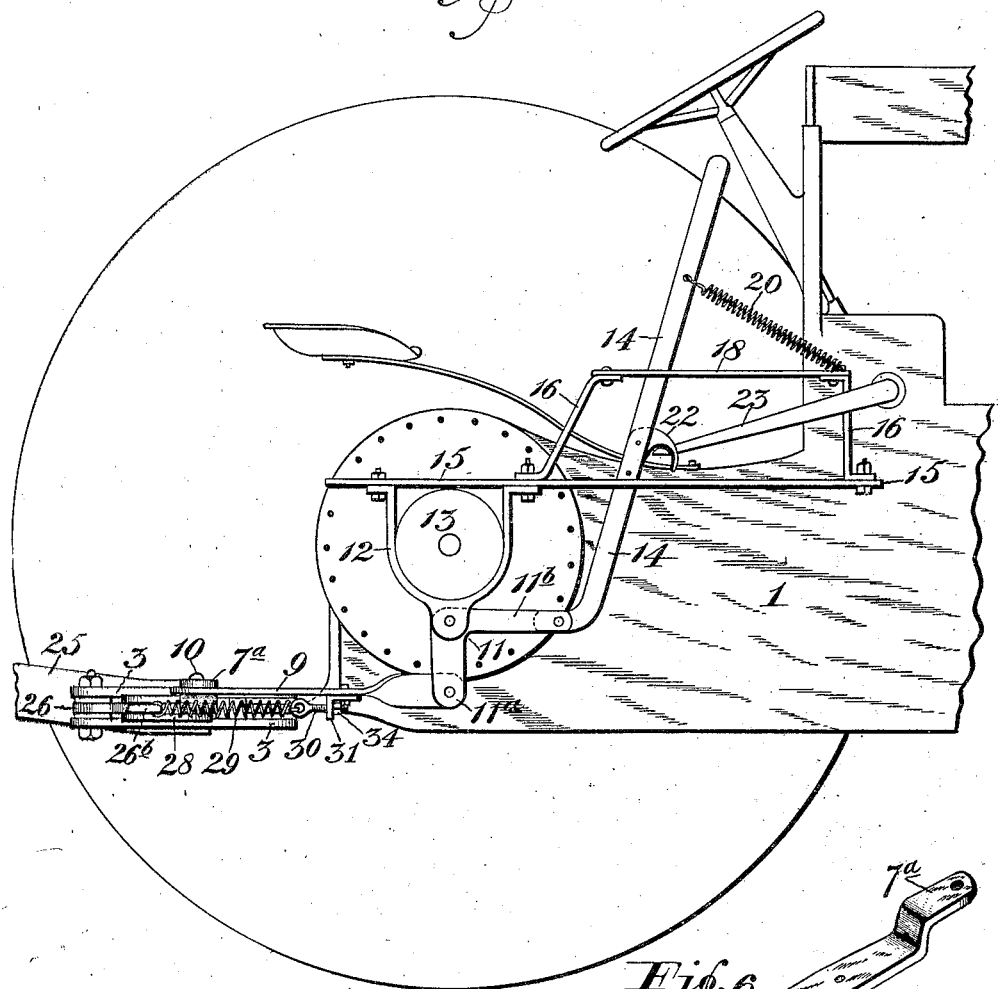
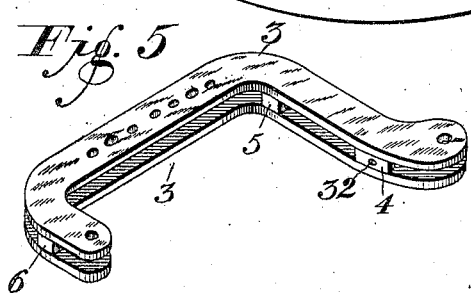
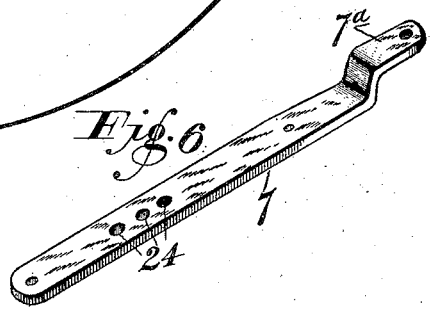
Inventors
Eugene J. Klink
and
Frank Mueller
By E. E. Overholt
Attorney Patented Dec. 5, 1922.

1,437,522

UNITED STATES PATENT OFFICE.

EUGENE J. KLINK AND FRANK MUELLER, OF JUNEAU, WISCONSIN.

AUTOMATIC STOP ATTACHMENT FOR TRACTORS.

Application filed June 29, 1921. Serial No. 481,351.

*To all whom it may concern:*

Be it known that we, EUGENE J. KLINK and FRANK MUELLER, citizens of the United States, residing at Juneau, in the county of Dodge and State of Wisconsin, have invented certain new and useful Improvements in Automatic Stop Attachments for Tractors, of which the following is a specification.

Our invention relates to automatic stop attachments for tractors.

The object is to provide means for automatically disconnecting the driving mechanism of the tractor, and thereby stopping the tractor whenever the plow or other implement drawn thereby strikes an obstruction, thus eliminating danger of damage to either tractor or implement.

A further object is to provide a device of this character which will be practically rigid under normal working conditions, so that it will not yield till a predetermined amount of resistance is encountered by the implement, but so arranged that when it does begin to yield, it will act easily and quickly, thereby insuring very prompt stoppage of the tractor.

A still further object is to provide a device of this character adapted for such broad and accurate adjustment that not only strong and powerful implements may be drawn by a tractor, but that comparatively light and delicate implements may be drawn by the same tractor with perfect safety, even on very rough, stumpy, or stony ground.

Minor objects will appear in the subjoined description.

An important feature of the invention consists principally in a series of spring-controlled levers interposed between the implement and the clutch mechanism of the motor, whereby the driving clutch of the motor is automatically disconnected whenever the implement encounters an obstacle offering more than a predetermined amount of resistance, said series of levers being provided with accurate adjusting mechanism of broad range for regulating the amount of resistance necessary to operate the device.

The invention consists in certain novel features of construction and arrangement of parts, as will be hereinafter described and claimed, reference being had to the accompanying drawings, in which:—

Fig. 1 is a top plan view of our device attached to a tractor.

Fig. 2 is a side elevation of the same.

Fig. 3 is a perspective view of a clamping strap.

Fig. 4 is a top plan view of the guide bar for the hand lever.

Fig. 5 is a perspective of the frame which carries the draw bar; and, Fig. 6 is a perspective view of the draw bar.

The numeral 1 indicates the tractor having a draw-bar 2, to which is rigidly attached the frame 3 formed of two parallel plates bent in the form shown in Figs. 1 and 5, said plates being held suitably spaced apart by the spacing blocks 4, 5, and 6, rigidly secured therebetween in any ordinary or preferred manner. The draw-beam 7 is pivoted at 8 to the inner rearwardly bent end of the rigid frame (being received between the two parallel sides of the frame), and at its outer end this beam is offset to form the section 7ª lying in a plane above the rest of the beam (as seen in Fig. 6) which is received on top of the connecting strap 9, being pivotally connected thereto by the pivot 10. The strap 9 extends forwardly substantially at right angles to the draw bar, and at its forward end is pivotally connected to the shorter downwardly extending arm 11ª of the bell-crank lever 11, which lever is pivotally received between the two downwardly extending parallel ears 12ª of the clamping strap 12 which is rigidly clamped to the axle case 13 of the motor. The longer arm 11ᵇ of the bell-crank lever is pivotally connected at its forward end to the lower end of the hand lever 14 for which it forms a support. The longitudinally extending bar 15 is rigidly mounted on the axle case 13 of the motor by means of the clamping strap 12; and suitably supported on this bar 15, by standards 16, is a guide bar 18 having a longitudinal guide slot 19, with the hand lever 14 extending upwardly therethrough. A tension spring 20 connects the upper end of the hand lever with the forward end of the guide bar 18 to impart to the lever a gentle forward tension. The guide slot 19 is provided at its rear end with an offset notch 21 in which the hand lever 14 may be held by the tension of the spring 20 when it is desired to hold said lever in its inoperative position, as will be more fully referred to hereafter.

Rigidly secured to the side of the hand lever 14 is a hook 22 adapted to normally engage the pedal of the clutch lever 23 of the tractor, so that when the hand lever is moved downwardly, the clutch lever will also be moved downwardly to disconnect the clutch and stop the tractor.

The draw-bar is provided with a plurality of openings 24 to which the plow or other implement 25 may be adjustably attached.

Attention is now called to a very important feature of our device, namely, the adjustable brace mechanism which yieldingly holds the draw-beam 7 against movement relatively to the frame 3. This mechanism comprises a bell-crank lever 26 having its shorter arm pivoted to the outer end of the frame at 27, and connected with the draw-bar by means of the forwardly extending pivoted links 28, so that said shorter arm and the links 28 form a toggle through which the backward pull on the outer end of the draw-bar is communicated to the end of the frame at the pivot 27. The longer arm 26$^a$ of the bell-crank lever extends outwardly and terminates in a hook 26$^b$ which engages one end of a spring 29, which extends forwardly and is engaged at its forward end by an eye-bolt 30, which is in turn adjustably anchored in a bracket 31 rigidly secured to the under side of the connecting strap 9. The spacing block 4 of the frame 7 has a threaded aperture 32 in which is received an adjusting bolt 33 adapted to bear outwardly against the inner end of the shorter arm of the bell-crank lever 26, to break the joint of the toggle formed by said shorter arm and the links 28, to permit the draw-bar to move rearwardly under excessive strain, said movement being resisted by the tension on the spring 29, which may be adjusted by the nut 34 on the outer end of the eyebolt 30.

The operation of our device is as follows:—The resistance of the implement to the forward movement of the tractor will impart to the outer end of the draw-bar 7 a tendency to move backward, which movement will be resisted by the toggle formed at the inner end of the bell-crank lever 26, the amount of resistance being determined by the adjustment of the bolt 33 and the tension placed on the spring 29. When the draw-bar moves rearwardly, it acts through the connecting strap 9 on the bell-crank lever 11, which in turn pulls the hand lever 14 downwardly causing the hook 22 thereon to pull the clutch lever 23 downwardly, so as to disconnect the driving clutch and thereby stop the tractor.

When it is desired to disconnect the automatic disengaging mechanism from the tractor, the hand lever 14 is drawn rearwardly against the action of the spring 20, and secured in the offset notch 21, which rearward movement of said lever disengages the hook 22 from the clutch-lever 23, leaving said lever to be operated in the usual way by the foot of the driver.

The joint at the middle of the toggle at the inner end of the bell-crank lever 28 is pressed inwardly by the tension on the spring 29, and the amount of said inward movement is preferably regulated by the adjusting bolt 33, which has a jamb-nut 35 to rigidly secure it at the exact adjustment desired. If the bolt 33 is sufficiently withdrawn to permit the central joint of the toggle to move inwardly out of alinement with the outer joints thereof, the automatic disconnecting mechanism will be rendered inoperative without moving the hand lever 14 to its inoperative position, as referred to above.

For very light implements, it will be seen that if the bolt 33 be adjusted to bring the middle joint of the toggle almost into alinement with the outer joints, a very slight tension on the spring 29 will cause the toggle to offer stubborn resistance to the rearward movement of the draw-bar; but when an obstruction is met and the toggle does begin to yield, the light tension on the spring 29 will permit it to yield with extreme ease and quickness. In fact, my arrangement will, under all circumstances, permit a very heavy pull on the draw-bar, with a comparatively light spring at the outer end of the bell-crank lever, if the toggle be set nearly straight.

From the foregoing it will be seen that we have produced a device capable of very broad and accurate adjustment, and one which holds the load very rigid up to a predetermined point of resistance, and possesses unusual facility for releasing the load, acting with great ease and quickness in this respect, so that the lightest and most delicate implements may be used under the most trying and unfavorable circumstances, with the strongest and most powerful motor.

Having now described our invention, what we claim as new and desire to protect by Letters Patent is:—

1. In a device of the character described, the combination of a frame adapted to be secured to a tractor; a draw-bar mounted on said frame and movable relatively thereto; a toggle interposed between said draw-bar and frame; means for yieldingly holding said toggle in position to resist the movement of the draw-bar relatively to the frame; and means for varying the angle of the sections of the toggle relatively to each other, to vary the resistance offered by the toggle to the movement of the draw-bar.

2. In a device of the character described, the combination of a frame adapted to be secured to a tractor; a draw-bar mounted on said frame and movable relatively thereto; a toggle interposed between said bar and frame; a spring for yieldingly holding the toggle in position to resist the movement of the draw-bar relatively to the frame; means for varying the angle of the sections of the toggle relatively to each other to vary the resistance offered by the toggle to the movement of the draw-bar; and means for varying the tension of said spring to further vary the yielding resistance of the toggle to the movement of the draw-bar.

3. In a device of the character described, a fixed frame adapted to be rigidly secured to a tractor; a draw-bar pivotally mounted on said frame and movable relatively thereto; a toggle interposed between said draw-bar and frame; a spring for yieldingly holding the toggle in position to resist the movement of the draw-bar relatively to the frame; means for varying the tension on said spring; and a screw for adjusting the angle of the sections of the toggle relatively to each other.

4. In a device of the character described, a frame adapted to be secured to a tractor; a draw-bar pivoted at one end to said frame and movable relatively thereto at its other end; means for yieldingly resisting the movement of said end of the draw-bar toward the frame; a hand lever provided with means for engaging the clutch lever of the tractor; operative connections between the movable end of the draw bar and the hand lever, whereby the movement of the end of the draw bar toward the frame disconnects the motor clutch; and a spring for normally holding the hand lever in position to engage the clutch lever, said hand lever being adapted to be withdrawn against the action of said spring, from engagement with the clutch lever; and means for holding the hand lever in its disengaged position when desired.

In testimony whereof we affix our signatures.

EUGENE J. KLINK.
FRANK MUELLER.